(12) United States Patent
Xu

(10) Patent No.: US 11,095,682 B1
(45) Date of Patent: Aug. 17, 2021

(54) MITIGATING PHISHING ATTEMPTS

(71) Applicant: Palo Alto Networks, Inc., Santa Clara, CA (US)

(72) Inventor: Wei Xu, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 227 days.

(21) Appl. No.: 15/249,172

(22) Filed: Aug. 26, 2016

(51) Int. Cl.
*H04L 29/06* (2006.01)

(52) U.S. Cl.
CPC ................. *H04L 63/1483* (2013.01)

(58) Field of Classification Search
CPC .................................................. H04L 63/1483
USPC ......................................................... 726/22
See application file for complete search history.

(56) References Cited

U.S. PATENT DOCUMENTS

| | | | |
|---|---|---|---|
| 7,971,246 B1* | 6/2011 | Emigh | G06F 21/552 726/22 |
| 8,516,590 B1* | 8/2013 | Ranadive | H04L 63/1433 713/187 |
| 8,839,369 B1* | 9/2014 | Dai | H04L 63/10 713/178 |
| 9,401,927 B2 | 7/2016 | Shulman | |
| 9,537,857 B1* | 1/2017 | Koved | H04L 63/083 |
| 2009/0228780 A1* | 9/2009 | McGeehan | G06F 21/55 715/234 |
| 2009/0328208 A1* | 12/2009 | Peters | H04L 63/1441 726/22 |
| 2010/0180121 A1* | 7/2010 | Chow | H04L 63/1483 713/175 |
| 2012/0124671 A1* | 5/2012 | Fritzson | G06F 21/577 726/26 |
| 2013/0212658 A1* | 8/2013 | Amaya Calvo | H04L 63/1441 726/6 |
| 2013/0263226 A1 | 10/2013 | Sudia | |
| 2014/0041024 A1* | 2/2014 | Larkins | G06F 21/554 726/22 |
| 2014/0059649 A1* | 2/2014 | Hu | H04L 63/1483 726/3 |
| 2015/0067833 A1* | 3/2015 | Verma | H04L 63/1483 726/22 |
| 2018/0007066 A1* | 1/2018 | Goutal | H04L 63/1416 |

OTHER PUBLICATIONS

Akiyama et al., "Active credential leakage for observing web-based attack cycle". In International Workshop on Recent Advances in Intrusion Detection (pp. 223-243). Springer, Berlin, Heidelberg. Oct. 2013.

Gajek et al., "A forensic framework for tracing phishers." The Future of Identity in the Information Society. Springer, Boston, MA, 23-35. 2008.

\* cited by examiner

*Primary Examiner* — Samson B Lemma
*Assistant Examiner* — Zoha Piyadehghibi Tafaghodi
(74) *Attorney, Agent, or Firm* — Van Pelt, Yi & James LLP

(57) ABSTRACT

Credential phishing attacks mitigation is disclosed. A URL that is associated with a suspicious web page is received. The suspicious web page is one that includes at least one element soliciting at least one credential. An artificial credential is provided to the suspicious web page. A determination is made that an attempt has been made to use the artificial credential to access a resource. In response to the determination that the attempt has been made, at least one remedial action is taken with respect to the suspicious web page.

27 Claims, 4 Drawing Sheets

300

```
From: ACME HR Department (HR@AcmeCorpInc.com)
To: Alice Jones (Alice.Jones@AcmeCorpInc.com)
Date: January 1
Subject: New Year, New Benefit Happy New Year, Alice!  We are pleased to announce that
ACME is offering free gym memberships to all employees
as a new benefit this year.  To get started with your
New Year's Resolutions, please enroll using the
following link.  You will be asked to verify your
eligibility as part of the signup process.

SIGN UP FOR YOUR MEMBERSHIP HERE ⸺⸺⸺⸺ ⌐302
```

ACME WELLNESS - SIGNUP    http://acmesignup.gymcorp2000.com ⸺358

Happy New Year!

ACME is pleased to announce that free gym memberships
are being made available to all employees as a new
benefit this year.

To get started with your New Year's Resolutions, please
verify your eligibility by logging into your ACME
Corporate account:

ACME USERID: [_____] ⸺352

ACME PASSWORD: [_____] ⸺354

[ VERIFY MY ELIGIBILITY ] ⸺356

FIG. 3B

MITIGATING PHISHING ATTEMPTS

BACKGROUND OF THE INVENTION

Individuals increasingly conduct business and other sensitive transactions online. Examples include online banking transactions (e.g., where a user logs into a bank's website to check a balance or move funds) and also other transactions, such as reading and writing sensitive emails (e.g., via a webmail interface), and committing source code changes (e.g., via a repository). Unfortunately, a legitimate user's credentials can be very valuable to nefarious entities, which can use the credentials to impersonate the legitimate user.

One way that nefarious entities obtain legitimate credentials from victims is through use of a phishing attack. In an example phishing attack, a nefarious entity sends to a victim an email that appears to have been sent by a legitimate organization with which the victim does business. For example, a nefarious entity might send to the victim an email that appears to have come from ExampleBank (with which the victim has an account), inviting the victim to "log in now to see if you qualify for a reduced mortgage rate" by clicking a link. Typically, the phishing email will include elements such as images, fonts, color schemes, etc., that make the email appear to be legitimately sent by ExampleBank. However, instead of directing the victim to the legitimate ExampleBank website, if the victim clicks on the link included in the phishing email, the victim will be taken to a bogus website (that appears legitimate but is not). The victim provides a legitimate username/password to the phishing site, and the nefarious entity captures the credentials, allowing the nefarious entity to use the victim's credentials on the legitimate bank site. As credentials become increasingly valuable, and as nefarious entities become more sophisticated, the dangers posed by phishing attacks are likely to increase. Improvements in detecting and preventing the harm caused by phishing attacks are therefore desirable.

BRIEF DESCRIPTION OF THE DRAWINGS

Various embodiments of the invention are disclosed in the following detailed description and the accompanying drawings.

FIG. 3A illustrates an example of an email message.

FIG. 3B illustrates an example of a web page.

DETAILED DESCRIPTION

Figure 1:
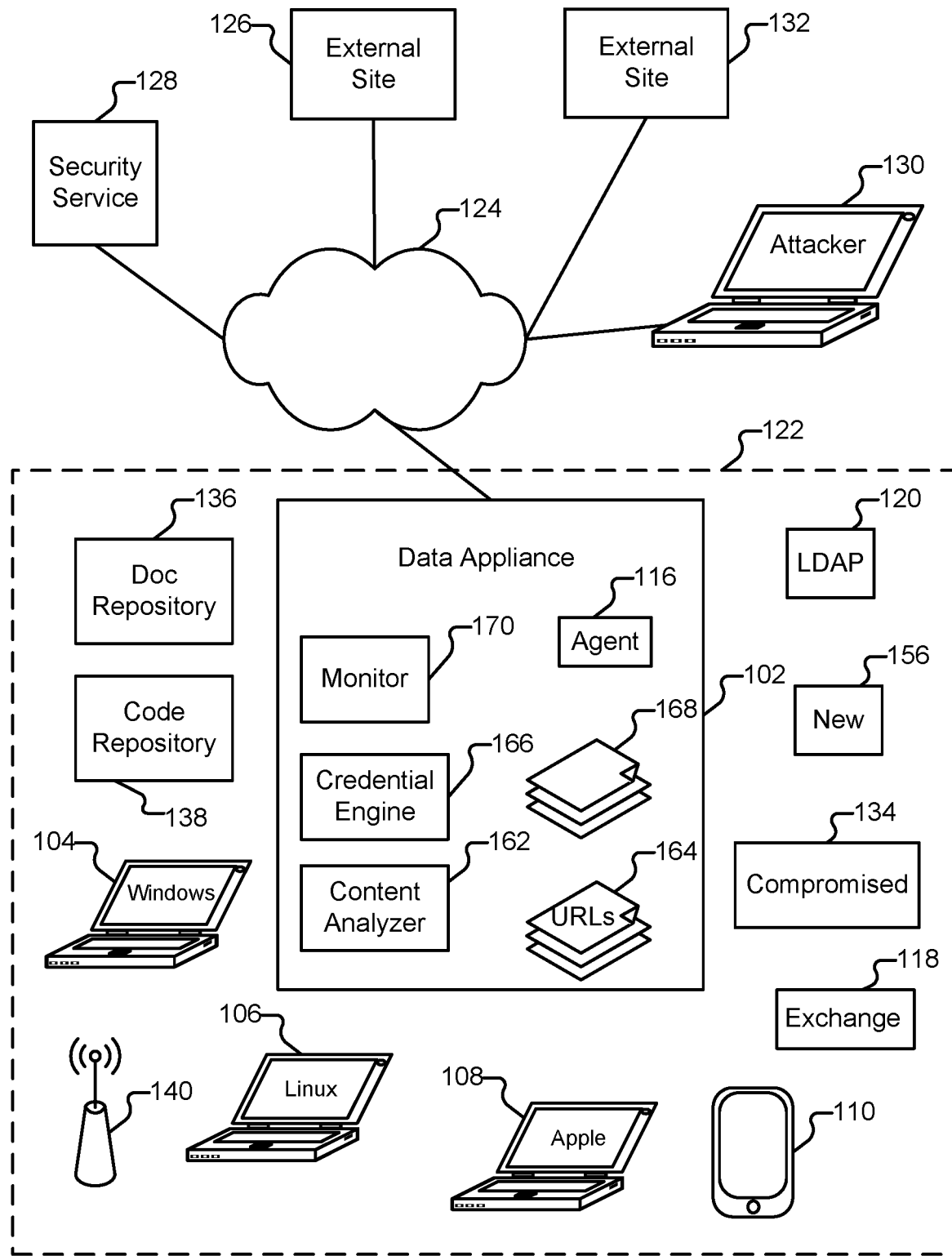
FIG. 1 illustrates an embodiment of an environment in which phishing attempts are mitigated (e.g., through detection and/or prevention).

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein).

Security devices (e.g., security appliances, security gateways, security services, and/or other security devices) can include various security functions (e.g., firewall, anti-malware, intrusion prevention/detection, and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content not just ports, IP addresses, and packets using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

FIG. 1 illustrates an embodiment of an environment in which phishing attempts are mitigated (e.g., through detection and/or prevention). As illustrated in FIG. 1, a variety of client devices 104-110 are present in an enterprise network 122 which belongs to the ACME Corporation. Device 104 is a computer running a Windows-based operating system and is assigned to Alice. Device 106 is a computer running an Ubuntu Linux operating system and is assigned to Bob. Device 108 is a computer running the Mac OS X operating system and is assigned to Charlie. Device 110 is a tablet computer running an Android-based operating system and is personally owned by Alice, who sometimes brings the device into work with her. Device 110 is not provided to Alice by ACME Corporation. Other types of devices may also be used in conjunction with the techniques described herein, such as cellular phones/personal digital assistants, tablet computers, game consoles, and set-top boxes.

Communications between client devices 104-110 and resources outside of network 122 (e.g., external site 126 reachable via a set of one or more external networks depicted as network cloud 124) pass through data appliance 102. Such communications may take place using any appropriate communication protocol, such as Hypertext Transfer Protocol (HTTP), Secure Sockets Layer (SSL), and File Transfer Protocol (FTP). In the example shown in FIG. 1, data appliance 102 is a firewall and is configured to enforce policies (also referred to herein as "rules") with respect to the communications it receives. In some embodiments, data appliance 102 is also configured to enforce policies with respect to traffic that stays within enterprise network 122 (e.g., communications among any of client devices 104-110 and/or other nodes depicted within network 122). Devices other than data appliance 102 can also be configured to provide the functionality described herein as being performed by data appliance 102, such as a router, gateway, intrusion detection system, intrusion prevention system, or other appropriate device. For example, such devices can implement phishing attempt detection and/or prevention/remediation techniques (described in more detail below and also referred to herein as anti-phishing processing), as applicable. Additionally, data appliance 102 can also be configured to work in cooperation with other devices/elements to jointly provide functionality described herein as being performed by data appliance 102. For example, data appliance 102 can be configured to provide phishing mitigation services in cooperation with an agent application 116 and/or a remote security service 128, as applicable. Agent application 116 can be implemented in a variety of ways, such as in a device that is separate from appliance 102, or as a module collocated on appliance 102 (as is shown in FIG. 1), as applicable.

Also included in network 122 is an authentication server 120. In the example shown in FIG. 1, authentication server 120 is a directory service provider (also referred to as a domain controller), which makes use of the Lightweight Directory Access Protocol (LDAP) or other appropriate protocols. One example of an authentication server 120 is a Microsoft Active Directory server. Other types of systems can also be used instead of an Active Directory server, such as a Kerberos-based system, and the techniques described herein adapted accordingly. Authentication server 120 is configured to manage user identity and credential information. Data appliance 102 uses information stored by authentication server 120 to enforce various policies. Such policies can apply to particular devices (e.g., device 104), particular users (e.g., "Alice Jones," denoted in authentication server 120 as the object Alice.Jones), and/or groups (e.g., "laptop devices," "employees in the Finance Department," and "director-level employees," each of which can also be represented in authentication server 120 as an applicable object or set of objects).

Figure 2:
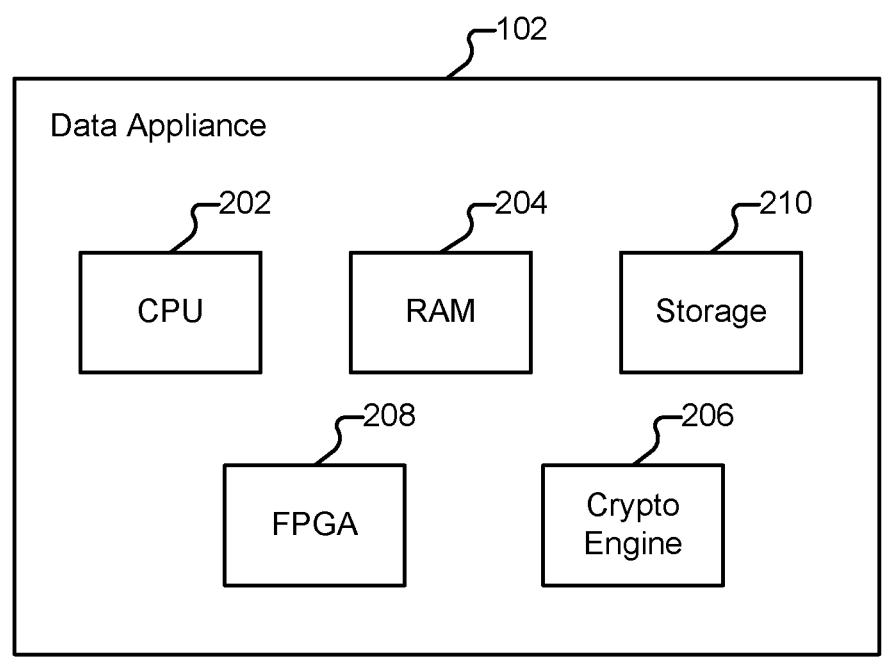
FIG. 2 illustrates an embodiment of a data appliance.

FIG. 2 illustrates an embodiment of a data appliance. The example shown is a representation of physical components that can be included in data appliance 102. Specifically, data appliance 102 includes a high performance multi-core CPU 202 and RAM 204. Data appliance 102 also includes a storage 210 (such as one or more hard disks), which is used to store policy and other configuration information, as well as additional information such as log data. Data appliance 102 can also include one or more optional hardware accelerators. For example, data appliance 102 can include a cryptographic engine 206 configured to perform encryption and decryption operations, and one or more FPGAs 208 configured to perform signature matching, act as network processors, and/or perform other tasks.

Example Phishing Attack Scenarios

Alice—New Employee Benefit

Alice (as well as Bob and Charlie) has a corporate email address with ACME and can access her corporate mail in a variety of ways. For example, Alice can read her corporate email on client device 104 using an installed mail application such as Outlook, can use a web browser to access a portal served by Exchange Server 118, and/or can use a mail client application or browser installed on her tablet 110 (which in turn communicates with Exchange Server 118).

Each morning when Alice arrives at ACME Corporation and logs into her computer 104, credential information is exchanged between client 104 and authentication server 120. Data appliance 102 is made aware of the fact that Alice has successfully logged into device 104, and is able to apply appropriate policies to Alice's communications, whether they are rules pertaining specifically to device 104, to Alice (e.g., the Alice.Jones object stored by authentication server 120), or to a group of which Alice's object is a member (e.g., the Finance Department). Throughout the day, Alice's computer communicates with mail server 118—a Microsoft Exchange Server in the example shown in FIG. 1—to send and retrieve email messages, calendar information, and other information, as applicable. Included in network 122 is an 802.11 wireless access point (140), which Alice has configured her personal tablet 110 to make use of.

As a worker in the Finance Department of ACME Corporation, suppose Alice has access to sensitive financial/intellectual property information. Further suppose an attacker wishes to target Alice and gain access to her corporate credentials (e.g., Alice's login and password information as stored with LDAP server 120) to read her email and/or access sensitive corporate documents (e.g., documents stored on document repository 136). One approach the attacker can take is to send Alice an email advertising a new corporate benefit. For example, the attacker could send to Alice the email depicted in FIG. 3A, which purports to be from the ACME HR Department, inviting her to enroll in a free corporate-sponsored gym membership. If Alice clicks on link 302, a web browser on whichever client device she is using to read email 300 (e.g., device 104 or device 110) will open and navigate to web page 350.

FIG. 3B illustrates an example of a web page. In particular, web page 350 is an example of a phishing page, soliciting credential information from visitors. Suppose that when Alice visits web page 350, she believes it to be a legitimate web page and enters her ACME username (e.g., "Alice.Jones") into field 352 and password into field 354. Web page 350 can be hosted in a variety of places. As one example, the attacker can register a seemingly legitimate domain, such as the one depicted in region 358 of FIG. 3B (http://acmesignup.gymcorp2000.com), and host the phishing page at an appropriate server outside network 122 (e.g., hosted at external site 126). As another example, if the attacker is able to gain access to a server within network 122 (e.g., because the attacker is a rogue employee, and/or due to compromise of a vulnerable server), the attacker can also host page 350 internal to network 122 (e.g., on compromised server 134). Further, the attacker can use a variety of approaches to capture Alice's entered credentials. As one example, when Alice clicks on button 356, her credentials can be emailed (or otherwise transmitted) to the attacker's computer 130, can be stored (e.g., at site 132 or server 134 as applicable) for later use/retrieval, etc. As applicable, the attacker can configure a message, such as "we will get back to you within 24 hours," to be displayed by page 350 to Alice to minimize the chances Alice will become suspicious of page 350 when she is unable to sign up for the (non-existent) gym offer. The attacker can use Alice's captured credentials to impersonate her, and thereby gain access to her email and documents on document repository 136 (e.g., by providing the credentials to Exchange Server 118, which will in turn provide them to authentication server 120, as applicable).

Bob—Source Code Repository

Suppose Bob works in the Engineering Department of ACME Corporation and has access to source code repository 138. An attacker might choose to target Bob to obtain Bob's credentials for accessing source code repository 138, whether to steal source code, to introduce unauthorized edits (e.g., compromising code stored therein), or for other nefarious purposes. An email similar to email 300 can be sent by the attacker to Bob, potentially resulting in Bob's credentials being captured by the attacker. Other approaches can also be used by the attacker to target Bob. For example, an attacker with access inside network 122 could send an email to Bob informing Bob that the Engineering Department has created a new portal for accessing various development resources. A link included in the email, when followed, could take Bob to a web page (e.g., hosted by server 134) that asks Bob to provide credential information (e.g., appearing to look like a single-sign-on portal). Bob would have no reason to suspect that he is being fraudulently targeted, and the attacker could gain access to source code repository 138 (or other resources) by using Bob's stolen credentials.

Mitigation Techniques

A primary goal of a phishing attack (such as the example attack scenarios described above with respect to Alice and Bob) is to obtain a legitimate credential and use it. As will be described in more detail below, using techniques described herein, suspicious web pages (such as page 350) can be detected (e.g., by appliance 102). A set of one or more "artificial" credentials (i.e., not belonging to a legitimate user, such as Alice) can be created and submitted (e.g., by appliance 102) to the suspicious page. Attempts at using the artificial credential(s) can then be monitored for (e.g., by appliance 102 communicating with authentication server 120). Since the artificial credentials do not belong to legitimate users, attempted use of the artificial credentials is indicative of a phishing attack, and one or more remedial actions can be taken, as applicable.

Returning to FIG. 1, in various embodiments, data appliance 102 includes a content analyzer 162 (e.g., written as a set of one or more scripts in an appropriate language, such as Java or C/C++) that compares any URLs in received emails (e.g., sent to ACME employees) against a URL whitelist, blacklist, or both, as applicable (depicted collectively as URL lists 164). A URL can be included in a URL whitelist (e.g., by default setting, by an administrator, etc.) if the site is known to be good (e.g., is a legitimate site into which ACME employees routinely log in). For example, if ACME uses a third party payroll processor (ExamplePayroll.com), that site can be included in the URL whitelist. If the legitimate payroll processor sends an email to Alice (e.g., asking her to log in to perform an action), because the URL appears in the whitelist, no additional anti-phishing processing need be performed by data appliance 102. In a phishing attempt purporting to be ExamplePayroll.com, however, the URL Alice is asked to click on will resolve to a different host (e.g., ExamplePayrool.com or an IP address), which will not be included in the whitelist and additional processing can be performed to protect ACME (as described in more detail below). Internal IP addresses of known good web servers can similarly be included in the URL whitelist as applicable (e.g., LDAP server 120, document repository 136, and/or source code repository 138). An internal address such as one belonging to compromised server 134 will not be included in the URL whitelist, and additional anti-phishing processing can be performed in the event URLs resolving to server 134 are included in emails handled by data appliance 102. In various embodiments, a URL blacklist specifies known malicious websites, e.g., as determined by security service 128 and provided to data appliance 102 as part of a subscription (or as otherwise appropriate). The URL blacklist can also be automatically updated, e.g., to include sites such as site 134 once it is discovered (e.g., using the techniques described herein) to be a phishing site. In the event an individual, such as Alice, is sent an email that includes a blacklisted URL, the email can be automatically deleted/quarantined/etc. without additional anti-phishing processing taking place.

In the event an incoming message includes a URL, and the URL is not included in a URL whitelist, additional anti-phishing processing can be performed. For example, content analyzer 162 can fetch the content accessible via the URL included in the message (e.g., using a tool such as "wget") and determine whether the page solicits user credentials. Example ways of performing such a determination include searching for indicative HTML form attributes, such as: input type="password" (or "pass," "login," etc.) and examining the text displayed on the page for similar key terms/phrases. If the page is determined by content analyzer 162 to not solicit user credentials, additional anti-phishing processing with respect to the message by data appliance 102 can be skipped. If the page does solicit credentials, additional anti-phishing processing can be performed. In particular, credential engine 166 can submit an artificial credential to the site, and monitor 170 can monitor authentication server 120 for attempted use of those artificial credentials. If an attempt at using the artificial credentials is made, this indicates both that the URL to which the credential(s) was submitted is a phishing page, and also that the submitter of the credentials is an attacker.

In various embodiments, credential engine 166 is a script (or set of scripts) written in an appropriate language, such as Java or C/C++. Credential engine 166 generates password strings (e.g., using a random string generator) and, in various embodiments, associates the generated passwords with fictitious employees (e.g., "Jonathan.Waters"—a fictitious member of the Engineering Department and/or "Paula.Simpson"—a fictitious member of the Finance Department). The fictitious employees can be included in authentication server 120 (e.g., created by an administrator), but need not be included (e.g., based on what type of authentication server is deployed). In some embodiments (e.g., for high profile individuals, such as the company CEO), an alternate login is created that otherwise appears to be for the individual. For example, if the CEO of ACME has a legitimate account of Jon.Jackson, in some embodiments, one of the fictitious entries in authentication server 120 is Jonathan.Jackson.

The artificial credentials generated by credential engine 166 are stored, along with the URL(s) to which they were submitted, in table 168 (or another appropriate data structure, as applicable). Monitor 170 can interact with authentication server 120 in a variety of ways to ascertain whether attempts at using artificial credentials occur. For example, in some embodiments, log data from authentication server 120 is collected and examined by agent application 116 (e.g., using one or more python scripts). Monitor 170 can periodically poll authentication server 120 for information about specific accounts (Jonathan.Waters) and can also parse an error or other appropriate log file (e.g., containing authentication attempts) for information associated with the fictitious users. Additional data can also be obtained from authentication server 120 (or other appropriate sources, such as other components of data appliance 102) in conjunction with attempts to use the fictitious credentials. For example, the originating IP address of a computer attempting to use a fictitious credential (e.g., the IP address of computer 130) can be extracted for additional processing. In some embodiments, instead of/in addition to obtaining log or other data from authentication server 120, monitor 170 uses functionality provided by data appliance 102 (as an intermediary of communications between authentication server 120 and other nodes within (and external to) network 122) to monitor for connection attempts to authentication server 120 and determine when fictitious credentials are used. For example, as a firewall, in various embodiments, data appliance 102 monitors traffic on network 122 for authentication requests sent to authentication server 120 and can examine which credentials are provided and to which resources in conjunction with techniques described herein.

Suppose Charlie, a member of the Engineering Department, has set up a server 156 for testing a new service. He would like Bob to test the service as well, and causes server 156 to send Bob an email asking Bob to log in to server 156, with a URL to a login web page on server 156. Server 156 does not appear in URL whitelist 164. When the email sent to Bob by server 156 is received by data appliance 102, content analyzer 162 will determine (e.g., based on terms like "login" appearing on the page reachable via the included URL) that additional anti-phishing processing should be performed. Credential engine 166 will generate a fictitious credential (e.g., for a fictitious user), and submit the credential to server 156. Monitor 170 will then monitor for attempts at using the credential (e.g., by consulting with authentication server 120). As server 156 was legitimately set up by Charlie, however, and is not a phishing site, the fictitious credentials generated by credential engine 166 will go unused at authentication server 120, and the anti-phishing processing performed by data appliance 102 will occur transparently to Bob and Charlie (not impeding their work).

In an alternate scenario, suppose that Dave (a disgruntled employee) has compromised server 134 and configured it to solicit corporate credentials. Dave causes versions of email 300 to be sent to a variety of individuals within ACME, including Alice and other key members of management, including the CEO, CFO, general counsel, etc. Server 134 is not included in URL whitelist 164. Accordingly, as with server 156, when data appliance 102 receives the phishing emails and determines that URL(s) to a page soliciting login information are present in those emails, credential engine 166 will generate fictitious credentials and submit them to compromised server 134. The multiple emails sent by Dave to the various individuals may all contain the same URL (e.g., "http://internalserver.local/login") and may also employ individualized URLs (e.g., "http://internalserver.local/loginAlice" or "http://internalserver.local/xkqsdfjh"). Data appliance 102 can variously create a single fictitious credential for use with host internalserver.local (an example of server 134), irrespective of the full path to the suspicious page, and can also create a fictitious credential for submission to each URL, as applicable. As another example of processing in the case of individualized URLs, data appliance 102 can determine that ten similar emails were all sent at the same time (e.g., based on timestamps, a common sender, and/or a threshold amount of common text), and submit a single fictitious credential via one of the included URLs.

A variety of actions can take place once one or more fictitious credentials are submitted to server 134. In some embodiments, data appliance 102 is configured to quarantine or otherwise delay delivery of emails that include URLs to pages soliciting login information for a period of time. For example, data appliance 102 can be configured to delay delivery of emails such as the ones sent by Dave for an hour (or more). Such a delay increases the likelihood that Dave (as a nefarious individual) will use the phished fictitious credential and confirm to data appliance 102 that server 134 is compromised before legitimate users do. When server 134 is determined to be compromised, data appliance 102 can take additional actions, such as preventing Alice (and the other intended recipients of the email) from receiving the message. As another example action, as a firewall, data appliance 102 can prevent access to server 134 for all users of network 122, or otherwise restrict access to server 134.

In some cases, the fictitious credential may not be used (e.g., by Dave) before a legitimate user interacts with a phishing site. As one example, suppose Dave's message is not quarantined, and/or that Alice attempts to log in to compromised site 134 before Dave attempts to use the fictitious credentials. In particular, suppose Alice interacts with server 134 (leaking her credentials to Dave) on a Monday. Dave uses Alice's credentials (e.g., to read Alice's email), and then a week later, Dave attempts to use the fictitious credentials. When Dave does attempt to use the fictitious credentials (e.g., attempting to log in to document repository 136), monitor 170 is alerted and data appliance 102 can take one or more remedial actions. In addition to the remedial actions already described above (such as blocking further access to server 134), an additional action data appliance 102 can take is to examine its logs to determine which other users (whether recipients of the email or not) connected to server 134 prior to use of the fictitious credentials (i.e., prior to data appliance 102's discovery that site 134 is a phishing site). In this example, data appliance 102 would determine that Alice connected to server 134 on Monday (e.g., by examining log data stored on data appliance 102), and can take additional remedial actions, such as disabling her access to resources on network 122 until she changes her password, alerting an administrator to meet with Alice, etc. Other users that also connected to server 134 can similarly be required to change their credentials.

Figure 4:
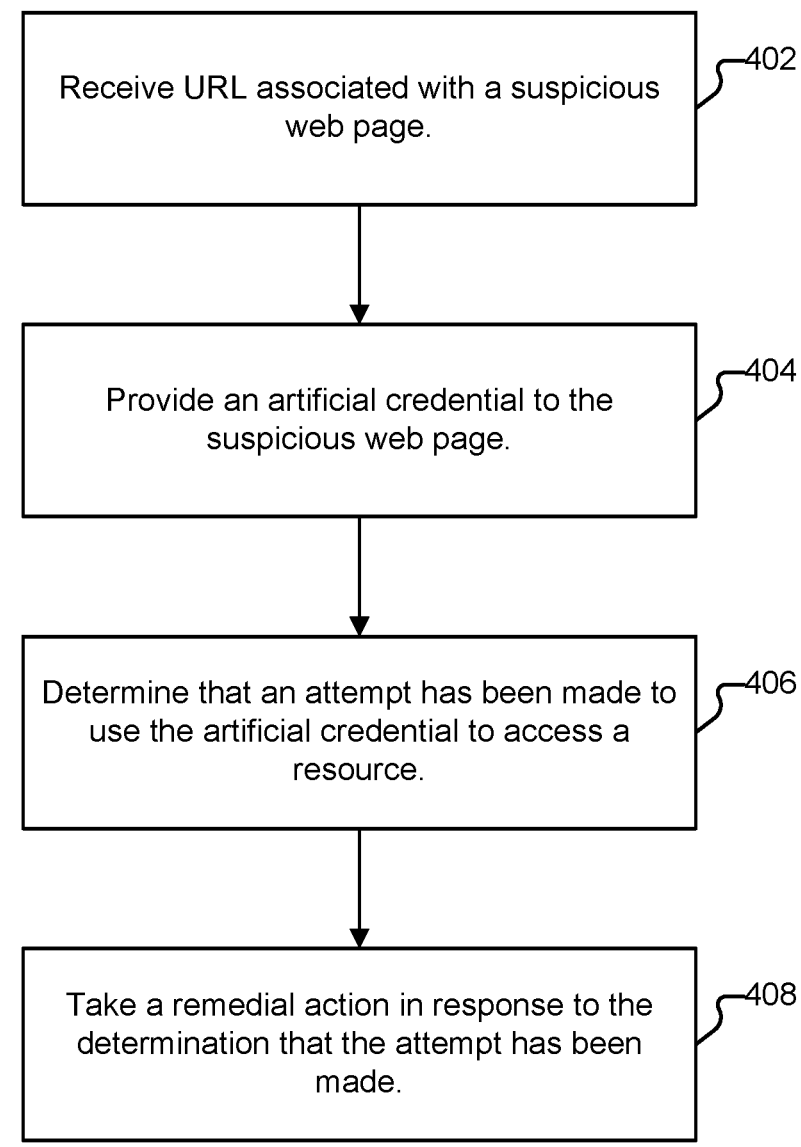
FIG. 4 illustrates an embodiment of a process for mitigating phishing attacks.

FIG. 4 illustrates an embodiment of a process for mitigating phishing attacks. In some embodiments, process 400 is performed by data appliance 102. In other embodiments (such as where agent 116 is located on a separate device, or other components shown in FIG. 1 as being incorporated into data appliance 102 are located (or replicated) elsewhere (e.g., with remote security service 128)), portions of process 400 can be adapted as applicable to be performed by other devices/components.

The process begins at 402 when a URL associated with a suspicious web page is received. As one example of processing performed at 402, data appliance 102 receives an email (e.g., addressed to Alice), determines that the email includes a URL that is not included in URL whitelist 164, and further determines that the page reachable via the URL solicits user credential information (e.g., using content analyzer 162). Other approaches to receiving the URL (and determining the URL is suspicious) can also be performed. For example, Exchange Server 118 can include a module configured to examine incoming messages for indicia of phishing attempts and report those URLs to data appliance 102 for further processing (instead of/in addition to data appliance 102 identifying the URLs). As another example, Alice's email client (e.g., installed on client device 104) can include a module configured to examine incoming messages for indicia of phishing attempts and report those URLs to data appliance 102 for further processing (instead of/in addition to data appliance 102 identifying the URLs). In various embodiments, whitelist 164 is omitted from the processing, and all emails containing URLs to sites that ask for credential information are treated as suspicious at 402.

At 404, an artificial credential is provided to the suspicious web page. As one example of the processing performed at 404, credential engine 166 generates an arbitrary password (e.g., "ksj238sjuweju2") and submits it (along with a username, such as Jonathan.Waters) to the suspicious web page. Additional processing can also be performed at 404, such as storing the generated password, the username, the URL to which the credential information was submitted, etc., in a log file stored with data appliance 102. In various embodiments (e.g., where storage available on data appliance 102 is limited), log data is transmitted to a different device (e.g., to security service 128 or another device located within network 122) instead of or in addition to the log data being stored on data appliance 102. In this manner, data appliance 102 can maintain a short history (e.g., spanning the most recent 24 hours of anti-phishing processing) of credentials and their submission and a longer history can be maintained elsewhere (e.g., for detecting phishing attempts where credentials are not initially used within 24 hours).

At 406, a determination is made that an attempt has been made to use the artificial credential to access a resource. As one example of the processing performed at 406, monitor 170 determines (e.g., by examining logs provided by authentication server 120, by querying authentication server 120, by being alerted by authentication server 120, or by receiving an alert from another component of data appliance 102) that Dave has attempted to access document repository 136 using an artificial credential previously provided to server 134 at 404.

Finally, at 408, one or more remedial actions are taken (e.g., in response to the determination made at 406). One example of a remedial action is for data appliance 102 to block access to the site (e.g., by enforcing an appropriate firewall rule). Another example of a remedial action is for data appliance 102 to permanently prevent delivery of any emails currently quarantined that contain the URL. Another example of a remedial action is for data appliance 102 to determine whether any users (e.g., of network 122) have already accessed the site and suspend their access to other resources within network 122.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:

receive a URL that is associated with a suspected credential phishing web page, wherein the suspected credential phishing web page includes at least one element soliciting at least one credential, and wherein the URL was included in a message having at least one intended recipient;

provide an artificial credential to the suspected credential phishing web page, wherein the artificial credential comprises a generated password, and wherein the artificial credential, when supplied during a request to access a resource, indicates that the request to access the resource is unauthorized;

receive an indication that, subsequent to providing the artificial credential to the suspected credential phishing web page, an attempted use of the artificial credential to access the resource was made; and in response to receiving the indication that the attempted use of the artificial credential to access the resource has been made, classify the suspected credential phishing web page as a confirmed credential phishing web page, determine a set of additional messages that include the URL, wherein each of the determined additional messages included in the set of additional messages has a respective additional recipient collectively comprising a set of additional recipients, and take at least one remedial action with respect to at least one additional recipient included in the set of additional recipients; and a memory coupled to the processor and configured to provide the processor with instructions.

2. The system of claim 1, wherein the indication that the attempted use of the artificial credential to access the resource was made is received in response to a determination that an authorization attempt was made against an authentication server.

3. The system of claim 1, wherein the processor is further configured to identify the set of additional recipients.

4. The system of claim 3, wherein the processor is further configured to identify the set of additional recipients at least in part by tracking email addresses to which the URL was sent.

5. The system of claim 1, wherein the processor is further configured to generate the artificial credential.

6. The system of claim 5, wherein the processor is configured to generate the artificial credential by using a randomizer.

7. The system of claim 1, wherein the processor is configured to generate an artificial login by selecting from a common username directory.

8. The system of claim 1, wherein the processor is further configured to quarantine any messages including the received URL from reaching legitimate users until a determination is made about whether the suspected credential phishing web page should be confirmed as the confirmed credential phishing web page.

9. The system of claim 1, wherein the at least one remedial action includes preventing the URL from being transmitted to legitimate users.

10. The system of claim 1, wherein the at least one remedial action includes blacklisting the URL.

11. The system of claim 1, wherein the processor is further configured to determine whether any recipients of the URL accessed the suspected credential phishing web page.

12. The system of claim 11, wherein the at least one remedial action includes preventing any recipients of the URL that accessed the suspected credential phishing web page from accessing the resource.

13. The system of claim 11, wherein the at least one remedial action includes requiring at least one recipient of the URL to change a password.

14. The system of claim 11, wherein the at least one remedial action includes flagging a server hosting the suspected credential phishing web page as compromised.

15. A method, comprising:

receiving a URL that is associated with a suspected credential phishing web page, wherein the suspected credential phishing web page includes at least one element soliciting at least one credential, and wherein the URL was included in a message having at least one intended recipient;

providing an artificial credential to the suspected credential web page, wherein the artificial credential comprises a generated password, and wherein the artificial credential, when supplied during a request to access a resource, indicates that the request to access the resource is unauthorized;

receiving an indication that, subsequent to providing the artificial credential to the suspected credential phishing web page, an attempted use of the artificial credential to access the resource was made; and in response to receiving the indication that the attempted use of the artificial credential to access the resource has been made, classifying the suspected credential phishing web page as a confirmed credential phishing web page, determining a set of additional messages that include the URL, wherein each of the determined additional messages included in the set of additional messages has a respective additional recipient collectively comprising a set of additional recipients, and taking at least one remedial action with respect to at least one additional recipient included in the set of additional recipients.

16. The method of claim 15, wherein the indication that the attempted use of the artificial credential to access the resource was made is received in response to a determination that an authorization attempt was made against an authentication server.

17. The method of claim 15, further comprising identifying the set of additional recipients.

18. The method of claim 15, further comprising generating the artificial credential.

19. The method of claim 15, further comprising determining whether any recipients of the URL accessed the suspected credential phishing web page.

20. A computer program product embodied in a non-transitory tangible computer readable storage medium and comprising computer instructions executed by a hardware processor for:

receiving a URL that is associated with a suspected credential phishing web page, wherein the suspected credential phishing web page includes at least one element soliciting at least one credential, and wherein the URL was included in a message having at least one intended recipient;

providing an artificial credential to the suspected credential phishing web page, wherein the artificial credential comprises a generated password, and wherein the artificial credential, when supplied during a request to access a resource, indicates that the request to access the resource is unauthorized;

receiving an indication that, subsequent to providing the artificial credential to the suspected credential phishing web page, an attempted use of the artificial credential to access the resource was made; and in response to receiving the indication that the attempted use of the artificial credential to access the resource has been made, classifying the suspected credential phishing web page as a confirmed credential phishing web page, determining a set of additional messages that include the URL, wherein each of the determined additional messages included in the set of additional messages has a respective additional recipient collectively comprising a set of additional recipients, and taking at least one remedial action with respect to at least one additional recipient included in the set of additional recipients.

21. The method of claim 17, further comprising identifying the set of additional recipients at least in part by tracking email addresses to which the URL was sent.

22. The method of claim 15, further comprising quarantining any messages including the received URL from reaching legitimate users until a determination is made about whether the suspected credential phishing web page should be confirmed as the confirmed credential phishing web page.

23. The method of claim 15, wherein the at least one remedial action includes preventing the URL from being transmitted to legitimate users.

24. The method of claim 15, wherein the at least one remedial action includes blacklisting the URL.

25. The method of claim 19, wherein the at least one remedial action includes preventing any recipients of the URL that accessed the suspected credential phishing web page from accessing the resource.

26. The method of claim 19, wherein the at least one remedial action includes requiring at least one recipient of the URL to change a password.

27. The method of claim 19, wherein the at least one remedial action includes flagging a server hosting the suspected credential phishing web page as compromised.

* * * * *